Aug. 21, 1923.

S. KAPLAN 1,465,714

WHEEL FOR AUTOMOBILES

Filed Oct. 15, 1921

WITNESSES

INVENTOR
Samuel Kaplan,
BY
ATTORNEYS

Aug. 21, 1923.
S. KAPLAN
WHEEL FOR AUTOMOBILES
Filed Oct. 15, 1921
1,465,714
3 Sheets-Sheet 2
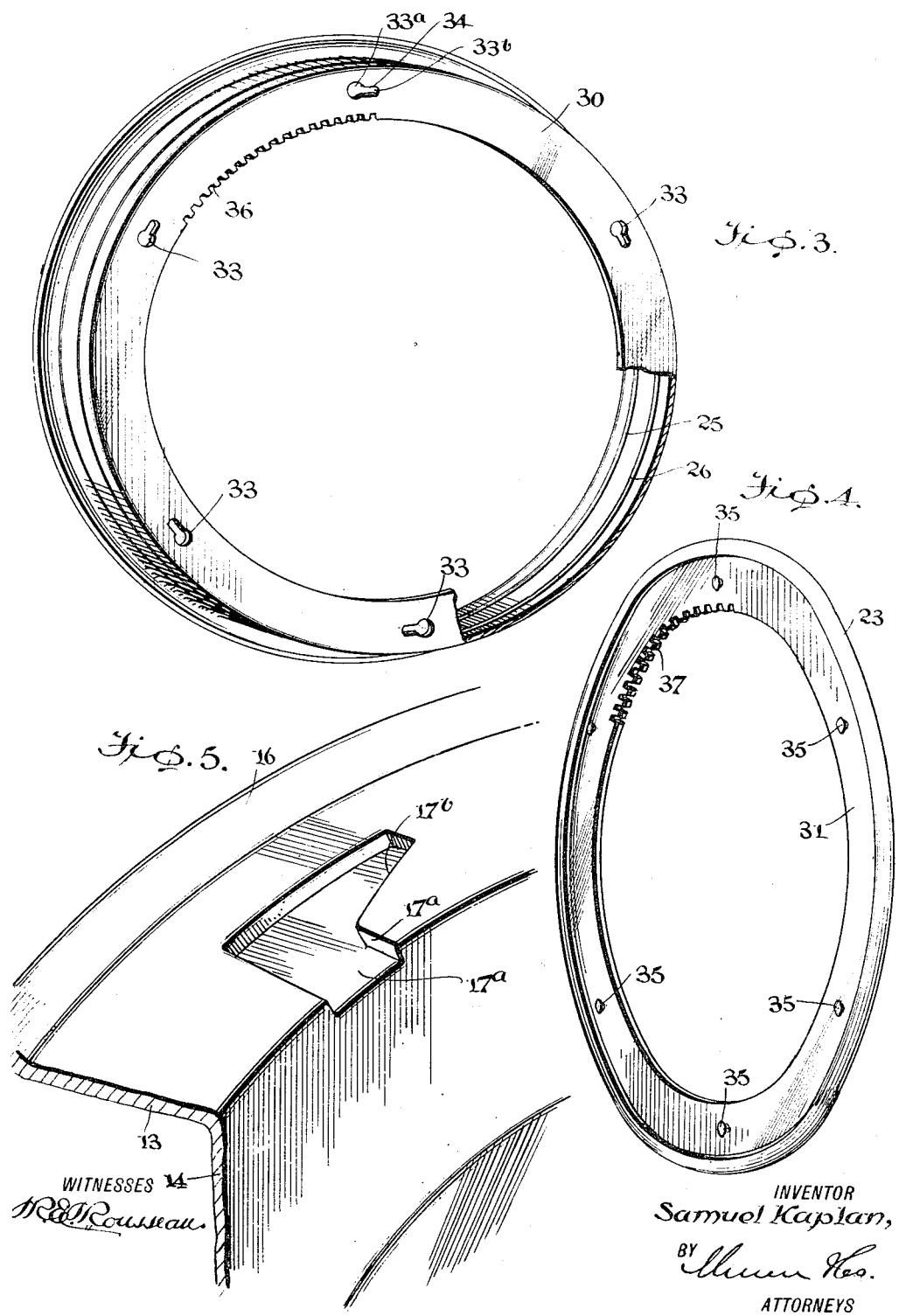

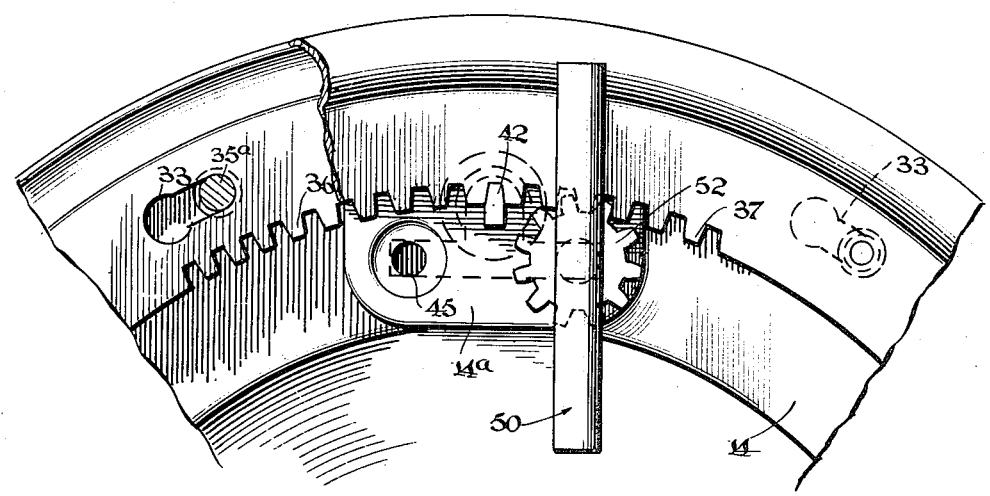
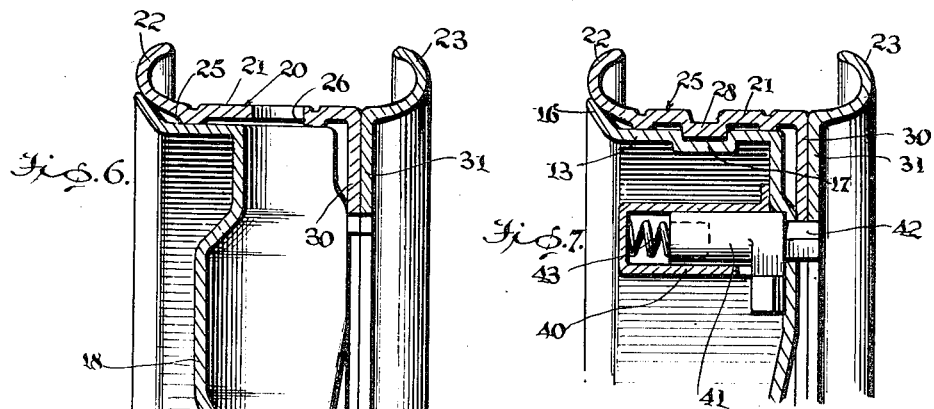

Patented Aug. 21, 1923.

1,465,714

UNITED STATES PATENT OFFICE.

SAMUEL KAPLAN, OF MONROE, LOUISIANA.

WHEEL FOR AUTOMOBILES.

Application filed October 15, 1921. Serial No. 507,813.

*To all whom it may concern:*

Be it known that I, SAMUEL KAPLAN, a citizen of the United States, and a resident of Monroe, in the parish of Ouachita and State of Louisiana, have invented certain new and useful Improvements in Wheels for Automobiles, of which the following is a specification.

This invention relates to an improvement in wheels for automobiles or other vehicles of the type including a demountable rim.

One of the principal objects of the invention is to provide a wheel of this character which is susceptible of ready and extremely economical manufacture, the parts thereof being in the main susceptible of being formed by stamping, pressing or similar mechanical process so as to facilitate the production of the wheel on a commercial scale.

Another object is to provide a wheel of this character wherein the demountable rim is easily assembled with and disassembled from the wheel while being securely though releasably locked in assembly, the organization being such that a single manipulation or operating movement serves both to release the locking means and to release the rim from its engagement with the wheel.

A further object is the provision of a wheel of this character in which the demountable rim is provided with a removable tire retaining flange adapted to be readily and easily assembled with and disassembled from the rim so as to permit of the removal and replacement of the tire without the necessity of taking the tire over the tire retaining flange, the means for securing the removable flange to the rim being so organized and constructed as to permit of the releasable locking thereof by the same locking means that serves to secure the rim itself in position on the wheel.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 3 is a perspective view of the demountable rim with the tire retaining flange removed;

Figure 4 is a similar view of the removable tire retaining flange;

Figure 5 is a fragmentary perspective view, illustrating the formation of the locking slot of the fixed rim;

Figure 6 is a view in transverse section on line 6—6 of Figure 1;

Figure 7 is a similar view, the section being taken in the plane of line 2—2 in Figure 1;

Figure 8 is a similar view on line 8—8 of Figure 1;

Figure 9 is a fragmentary view in elevation illustrating the locking and operating mechanism for both the rim and the removable flange;

Figure 12 is a detail perspective view of the locking pawl or bolt and associated structure.

Figures 1, 2:
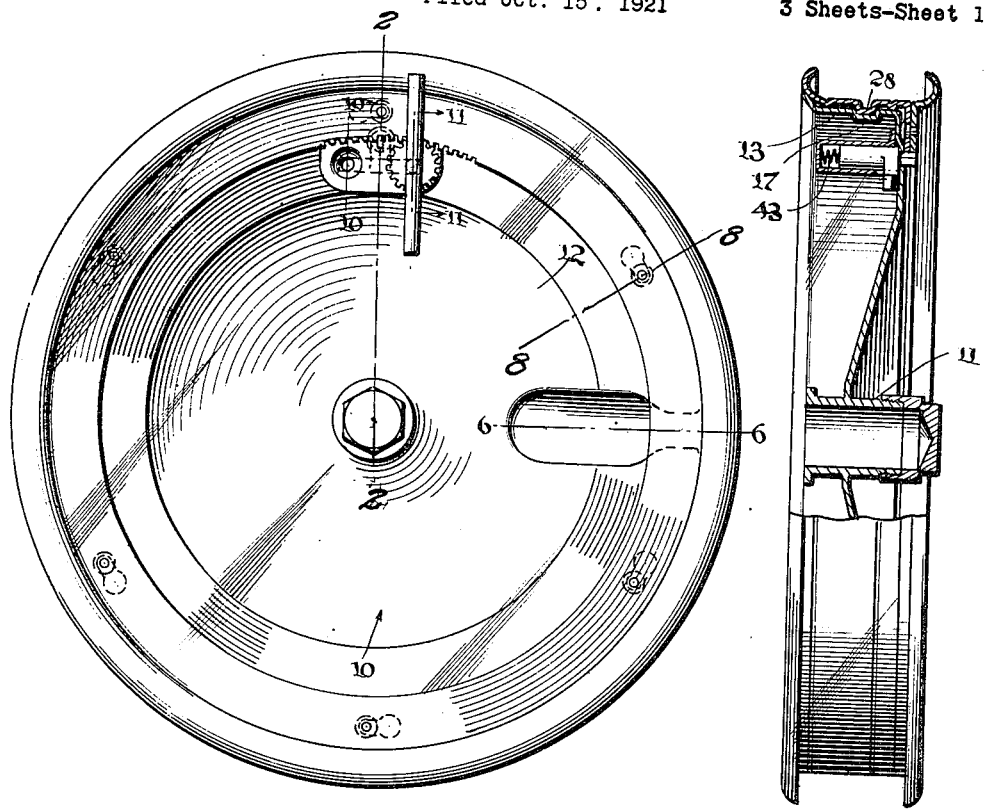
Figure 1 is a view in side elevation of the preferred embodiment of the invention.
Figure 2 is a view thereof in edge elevation, parts being broken away and other parts being shown in section on the line 2—2 of Figure 1.

Referring to the drawings wherein for the sake of illustration is shown the preferred embodiment of this invention, the numeral 10 designates generally a wheel. The wheel is shown as being of the disk type but it is obvious that the invention may be embodied in any type of wheel and is well adapted for embodiment in a wire wheel or a wooden wheel after the manner shown in application, Serial No. 483,923, filed July 11, 1921. It is to be noted that this invention is an improvement in a wheel of the type shown in this application and also applications, Serial No. 483,922, filed July 11, 1921, Serial No. 506,766, filed Oct. 10, 1921, and in Patent No. 1,383,810 of July 5, 1921.

The wheel comprises a hub 11, a web or body portion 12 and a fixed rim or felly 13 which is connected to the web or body portion by a flat plate like portion 14 which is preferably integral with the fixed rim and with the body portion and is disposed at right angles to the axis of the wheel.

The fixed rim 13 is provided with a circumferential shoulder 16 extending around its inner marginal edge and the shoulder 16 is beveled to constitute an abutment for the demountable rim. The fixed rim is constructed of resilient metal and at spaced angular intervals around its periphery it is pressed or stamped to provide L-shaped locking slots 17 having transverse entering sections 17ª and circumferentially extending tapered sections 17ᵇ. At one point in the periphery of the rim the metal of the rim and of the flat connecting portion and body portion is pressed inwardly, as shown in Figure 6, to provide a chamber, designated at 18, for the tire valve.

A demountable rim, designated generally at 20, is provided and includes a base section 21, an inner fixed tire retaining flange 22 and an outer removable tire retaining flange 23. The demountable rim is also constructed of resilient metal and its base section is pressed to provide ridges 25 and 26 on the underside of the rim, the ridges in the assembly seating upon the fixed rim and positively supporting the demountable rim. At spaced angular intervals the base sections of the demountable rim have pressed therefrom tapered locking lugs 28 which coact with the locking slots 17 of the fixed rim to releasably secure the demountable rim in position on the fixed rim. In assembling the demountable rim on the fixed rim the locking lugs 28 are passed laterally through the entering section 17ª of the locking slots and are then rotated into the tapered sections of these locking slots. The locking lugs correspond in contour to the contour of the tapered section 17ᵇ of the locking slots whereby the engagement of the locking lugs with the locking slots is made more highly effective.

Means is provided for releasably securing the removable tire retaining flange 23 in assembly with the rim and includes a locking plate 30 integral with the base section 21 of the rim, and a locking plate 31 integral with the removable tire retaining flange 23. As shown in Figure 3, the locking plate 30 is provided with a series of openings, designated generally at 33, and each of which is formed with an enlarged entering section 33ª and a relatively small locking section 33ᵇ defined by locking shoulders 34. A plurality of buttons or locking studs 35 are carried by the locking plate 31, these locking buttons having shanks 35ª welded to the locking plate 31 and having heads 35ᵇ spaced from the locking plate 31 and adapted to be inserted through the entering sections 33ª of the openings 33 and rotated behind the locking shoulders 34, the shanks 35ª being at this time received in the small section 33ᵇ of the opening 33.

The locking plates 30 and 31 are provided with toothed portions or gear segments, designated at 36 and 37, respectively, which are so related to each other that when the tire retaining flange 23 is assembled with the rim with its locking buttons firmly engaged behind the locking shoulders 34, the gear segments and the teeth thereof are in alinement.

Common means cooperable with the gear segments is provided for releasably locking both the removable flange to the rim and releasably locking the rim on the wheel and for operating both the flange and the rim. For this purpose a tubular casing or housing 40 is secured to the rear of the flat plate portion 14 and slidably receives a carrier 41 of a bolt 42. The bolt 42 projects from the carrier through an opening provided therefor in the plate portion 14 and in locking position this bolt enters the space between adjacent teeth of both the gear segments 36 and 37. A spring 43 is arranged in the housing 40 and coacts with the carrier 41 to project the bolt 42. The carrier 41 is provided with release arms 44 which are arranged below and are offset laterally therefrom and which are disposed behind openings 45 and 46 provided in a flattened section 14ª of the plate portion 14.

Figures 10, 11:
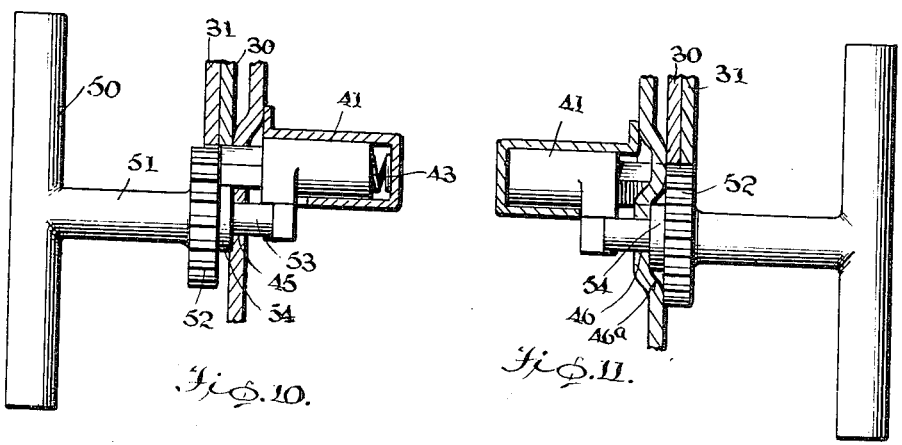
Figure 10 is a view, partly in section and partly in elevation, illustrating the operating mechanism when serving to remove the tire retaining flange.
Figure 11 is a similar view when removing the rim from the wheel.

An operating tool or wrench, designated generally at 50, is provided and includes a shank 51 having a pinion 52 fixed thereon and provided at its end beyond said pinion 52 with a reduced extension 53 and a circular stop element 54. The wrench may be utilized either to remove the tire retaining flange 23 from the rim, leaving the rim on the wheel, or to remove the rim as an entity from the wheel. When used to remove the flange 23 from the rim the extension 53 of the shank of the tool is inserted in the opening 45, as shown in Figure 10. The extension of the shank 51 engages one of the release arms 44 and retracts the bolt 42 to such an extent that it no longer engages the teeth of the gear segments 37 although it still continues to engage the teeth of the gear segment 36. Complete retraction of the bolt is precluded by the stop element 54 which also serves to permit the pinion 52 to engage only the gear segment 37 and to prevent engagement or meshing of this gear pinion with the gear segment 36. Then when the wrench is turned in a counterclockwise direction, as viewed in Figure 1, the removable tire retaining flange is rotated in a counterclockwise direction so as to bring its locking buttons into alinement with the enlarged or entering sections 33ª of the openings 33 and thus permit lateral movement of the flange and its ready removal from the rim. Similarly when it is desired to remove the entire rim from the wheel, the wrench has its extension 53 inserted through the opening 46, and at this time the stop element 54 is received in a recess or depression 46ᵃ so as to permit the extension 53 to fully retract the bolt and move it out of engagement with both gear segments and at the same time to permit the pinion 52 to completely mesh with both the gear segments 36 and 37, all as shown in Figure 11. Then when the wrench is turned the entire rim is moved relative to the wheel so as to move the locking lugs 28 into engagement with the entering sections 17ᵇ of the locking slot or out of engagement therewith and into alinement with the entering sections 17ᵃ thereof accordingly as the tool is turned in one or the other direction.

When the operating tool is thus used, it automatically releases the locking mechanism and at the same time serves to actuate either the flange or the demountable rim through the desired movements. When the locking tool is removed after the rim or flange have been assembled the spring 43 is at once effective to project the locking bolt into the spaces between the teeth of the gear segment to releasably lock these elements in position. In this manner the rim may be assembled and removed with the minimum expenditure of time and effort and without requiring the exercise of any special skill or of any tool other than the operating tool or wrench 50 which is provided as a part of the organization.

I claim:

1. In a wheel, a fixed rim, a demountable rim adapted to be assembled with the fixed rim by movement circumferentially with respect thereto, said demountable rim having a removable tire retaining flange adapted to be assembled with the demountable rim by circumferential movement with respect thereto, said demountable rim and said flange each having a gear segment formed thereon, said fixed rim having a socket adapted to permit of operative engagement of an operating tool with both of said gear segments whereby the demountable rim may be moved circumferentially with respect to the fixed rim in assembling the same with and taking the same from the fixed rim, said fixed rim also having a second socket adapted to permit of operative engagement of an operating tool with the gear segment of the tire retaining flange alone whereby the tire retaining flange may be moved circumferentially with respect to the demountable rim in assembling the same with and taking the same from said demountable rim.

2. In a wheel, a fixed rim, a demountable rim adapted to be assembled with the fixed rim by movement circumferentially with respect thereto, said demountable rim having a removable tire retaining flange adapted to be assembled with the demountable rim by circumferential movement with respect thereto, said demountable rim and said flange each having a gear segment formed thereon, said fixed rim having a socket adapted to permit of operative engagement of an operating tool with both of said gear segments whereby the demountable rim may be moved circumferentially with respect to the fixed rim in assembling the same with and taking the same from the fixed rim, said fixed rim also having a second socket adapted to permit of operative engagement of an operating tool with the gear segment of the tire retaining flange alone whereby the tire retaining flange may be moved circumferentially with respect to the demountable rim in assembling the same with and taking the same from said demountable rim, and means cooperating with said gear segments for preventing circumferential movement of said flange with respect to said demountable rim or of said demountable rim with respect to said fixed rim in assembly.

3. In a wheel, a fixed rim having a locking plate, a demountable rim including a base section having a locking plate and a removable tire retaining flange having a locking plate, cooperating means between the fixed rim and the demountable rim for releasably securing the demountable rim on the fixed rim against all except circumferential movement, cooperating means between the locking plate of the tire retaining flange and the locking plate of the base section for releasably securing the tire retaining flange against all except circumferential movement, releasable locking means cooperable with the locking plates for holding the demountable rim and the flange against circumferential movement, said locking plates being formed with gear segments adapted to selectively cooperate with an operating tool for moving the flange or the demountable rim circumferentially.

4. In a wheel, a fixed rim having a locking plate, a demountable rim including a base section having a locking plate and a removable tire retaining flange having a locking plate, cooperating means between the fixed rim and the demountable rim for releasably securing the demountable rim on the fixed rim against all except circumferential movement, cooperating means between the locking plate of the tire retaining flange and the locking plate of the base section for releasably securing the tire retaining flange against all except circumferential movement, and common locking mechanism cooperable with the locking plates of the fixed rim and of the demountable rim for securing the demountable rim and the tire retaining flange against circumferential movement and including gear segments formed on the locking plates of the demountable rim, and a spring projected locking bolt carried by the locking plate of the fixed rim and cooperable with the gear segments.

5. In a wheel, a fixed rim having a locking plate, a demountable rim having a locking plate adapted to be disposed in cooperative relation with respect to the locking plate of the fixed rim in the assembly, cooperating means between the fixed rim and the demountable rim for releasably securing the demountable rim on the fixed rim against all except circumferential movement, and locking mechanism for securing the demountable rim against circumferential movement and including a gear segment carried by the locking plate of the demountable rim and a spring projected bolt carried by the locking plate of the fixed rim and cooperable with the gear segment, whereby common means may be utilized for releasing the locking bolt and moving the demountable rim circumferentially.

SAMUEL KAPLAN.